Patented Jan. 7, 1936

2,027,066

UNITED STATES PATENT OFFICE 2,027,066

SOLID MINERAL ACID DIAZONIUM SALTS AND A PROCESS OF PREPARING THEM

Karl Schnitzspahn, Offenbach-on-the-Main, Germany, assignor to General Aniline Works, Inc., New York, N. Y., a corporation of Delaware No Drawing. Application June 29, 1934, Serial No. 733,128. In Germany July 7, 1933

6 Claims. (Cl. 260—69)

The present invention relates to new solid mineral acid diazonium salts from halogen-4-aminodiphenylethers and to a process of preparing them.

I have found that the simple mineral acid diazonium salts from halogenated 4-amino-diphenylethers may be separated in solid form with very good yields from their aqueous solutions by simply adding a salt to the solutions as they are, for instance, obtained by diazotizing the said halogen-4-amino-diphenylethers.

These solid diazonium salts are new products. They are very easily soluble in water and possess a very good stability, so that they may be marketed and furnished to the dyer in this form of stable salts for dyeing purposes. Other substances and materials which aid in dyeing and are customary as additions to dyeing salts may be added to the new diazonium salts.

It is of great importance that in spite of the very good solubility of the diazonium salts the separation may be performed with great ease by simply salting out.

The following examples serve to illustrate the invention but they are not intended to limit it thereto; the parts are by weight.

(1) 270 parts of the sulfate of 4-amino-2-chloro-diphenyl-ether are introduced, while cooling, into a solution of 140 parts of nitrosyl-sulfuric acid in 560 parts of sulfuric acid of 90% strength. Then, stirring is continued at ordinary temperature until the diazotization is finished. The clear sulfuric acid diazotization melt is then introduced in 2500 parts of ice-water. By addition of 900 parts of anhydrous sodium sulfate the diazonium sulfate is salted out, filtered off and dried in the usual manner.

In the same manner the solid diazonium sulfate of 2-bromo-4-aminodiphenylether is obtained.

(2) 220 parts of 4-amino-2-chloro-diphenylether are diazotized with 880 parts of water, 360 parts of hydrochloric acid of 30% strength and 360 parts of sodium nitrite solution of 20% strength. If necessary, the diazo solution is filtered and in the clear solution 380 parts of sodium chloride are dissolved, whereby the diazonium chloride precipitates with a nearly quantitative yield; it may be filtered and dried.

(3) By dissolving 200 parts of potassium bromide in the diazo solution obtained according to Example 2, the diazonium bromide precipitates with a nearly quantitative yield in the form of yellow crystals. It may be filtered off and dried at a low temperature. It can, however, before being dried, and therefore in still moist condition, be mixed with any suitable diluent, such as sodium sulfate or aluminium sulfate, whereby its explosiveness may be essentially diminished.

(4). By dissolving 200 parts of sodium nitrate in the diazo solution obtained according to Example 2, the diazonium nitrate precipitates in the form of nearly colorless crystals. It may be filtered off and worked up as described in Example 3.

(5) 108 parts of the sulfate of 4-amino-2-chloro-diphenylether are diazotized with 1300 parts of sulfuric acid of 15% strength and 290 parts of sodium nitrite solution of 10% strength. The finished diazo solution is filtered at 35° C. to 40° C. 300 parts of anhydrous sodium sulfate are added to the filtrate. The diazonium sulfate, thus precipitated, is filtered at 10° C. to 15° C. and dried.

(6) 219.5 parts of 4 - amino - 4' - chloro-diphenylether are diazotized with 300 parts of hydrochloric acid of 30% strength, 800 parts of water and 198 parts of sodium nitrite solution of 38.3% strength. To this diazo solution 150 parts of sulfuric acid of 95% strength are added cautiously, drop by drop, and 250 parts of anhydrous sodium sulfate are strewn in, whereby the diazonium sulfate precipitates nearly quantitatively; it may be filtered and dried.

(7) 288.5 parts of 4-amino-2,2',5'-trichloro-diphenylether are diazotized with 1150 parts of water, 480 parts of hydrochloric acid of 30% strength and 360 parts of sodium nitrate solution of 20% strength. The diazo solution obtained is filtered, if necessary, and 400 parts of sodium chloride are added; thereby the diazonium chloride precipitates with a very good yield. It may be filtered off and dried.

(8) 254 parts of 4 - amino-2,6-dichloro-diphenylether are diazotized with 4000 parts of water, 480 parts of hydrochloric acid of 30% strength and 360 parts of sodium nitrite solution of 20% strength. The diazo solution is then filtered and 1,000 parts of sodium chloride are added; thereby the diazonium chloride precipitates, which may be filtered and dried at a low temperature.

(9) By adding 150 parts of sulfuric acid of 95% strength and 800 parts of anhydrous sodium sulfate to the diazo solution obtained according to Example 8, the corresponding diazonium sulfate precipitates.

(10) 233.5 parts of 4-amino-2-chloro-5-methyl-diphenylether are diazotized with 360 parts of hydrochloric acid of 30% strength, 1,000 parts of water and 198 parts of sodium nitrite solution of 38.3% strength. In this diazo solution 300 parts of sodium bromide are dissolved. The diazonium bromide precipitates in the form of yellow crystals; it may be filtered and worked up as described in Example 3.

(11) 233.5 parts of 4-amino-3-chloro-6-methyl-diphenylether are diazotized with 960 parts of hydrochloric acid of 15% strength and 360 parts of sodium nitrite solution of 20% strength. The thus obtained diazo solution is filtered and 150 parts of sulfuric acid of 95% strength are introduced, drop by drop, while cooling; thereupon 300 parts of anhydrous sodium sulfate are strewn in, whereby the diazonium sulfate precipitates; it is filtered off and dried.

(12) 254 parts of 4 - amino-2,4'-dichloro-diphenylether are diazotized with 360 parts of hydrochloric acid of 30% strength, 2,500 parts of water and 360 parts of sodium nitrite solution of 20% strength. By dissolving 300 parts of sodium nitrate in this diazo solution, the diazonium nitrate precipitates with a very high yield; it may be filtered off and dried with special precaution at a low temperature.

(13) By using instead of 4-amino-2,4'-dichlorodiphenylether (of Example 12) 254 parts of 4-amino-2, 2'-dichloro-diphenylether the corresponding diazonium nitrate is obtained.

(14) 233.5 parts of 4-amino-2-chloro-2'-methyl-diphenylether are diazotized with 2,100 parts of sulfuric acid of 15% strength and 360 parts of sodium nitrite solution of 20% strength. In this diazo solution, filtered if necessary, 500 parts of anhydrous sodium sulfate are dissolved. The precipitated diazonium sulfate is filtered off and dried at a low temperature.

(15) 233.5 parts of 4-amino-2-chloro-4'-methyldiphenylether are diazotized with 360 parts of hydrochloric acid of 30% strength, 1,000 parts of water and 360 parts of sodium nitrite solution of 20% strength. The diazo solution is filtered and 300 parts of sodium chloride are dissolved therein; the diazonium chloride precipitates thereby with a very high yield; it is filtered off and dried.

(16) In an analogous manner there is obtained from 233.5 parts of 4-amino-2-chloro-3'-methyl-diphenylether the corresponding diazonium chloride with a nearly quantitative yield.

(17) 323 parts of 2-chloro-4-amino-2',4',6'-trichlorodiphenylether are introduced, while cooling, into a solution of 140 parts of nitrosylsulfuric acid in 800 parts of sulfuric acid of 95% strength. The whole is then stirred for 6 hours at 40° C. to 45° C., whereby dissolution takes place. The melt is then poured into 1,000 parts of ice and 1,000 parts of water, whereby the diazonium sulfate begins to precipitate. The precipitation is completed by addition of 200 parts of anhydrous sodium sulfate. The diazonium sulfate is filtered off and dried in the usual manner.

(18) 323 parts of 2-chloro-4-amino-2',4',5'-trichloro-diphenylether are diazotized with 3,200 parts of water, 600 parts of hydrochloric acid of 30% strength and 360 parts of sodium nitrite solution of 20% strength. If necessary the diazo solution is filtered and in the clear solution 500 parts of sodium chloride are dissolved, whereby the diazonium chloride precipitates nearly quantitatively; it may be filtered off and dried.

I claim:

1. Solid mineral acid diazonium salts from halogen-4-amino-diphenylethers which salts are easily soluble in water and possess a good stability.

2. The solid diazonium chloride from 4-amino-2-chloro-diphenylether of the formula

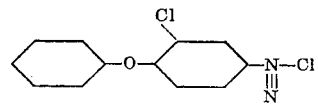

being easily soluble in water and possessing a good stability.

3. The solid diazonium chloride from 4-amino-2,2',5'-trichloro-diphenylether of the formula

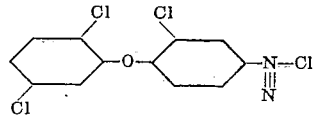

being easily soluble in water and possessing a good stability.

4. The solid diazonium sulfate from 4-amino-4'-chloro-diphenylether of the formula

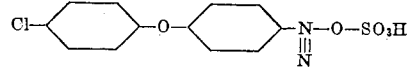

being easily soluble in water and possessing a good stability.

5. The process which comprises causing the mineral acid diazonium salts of halogen-4-amino-diphenylethers to separate from their aqueous solutions in solid form by adding a mineral acid salt to these solutions.

6. The process which comprises causing the mineral acid diazonium salts of halogen-4-amino-diphenylethers to separate from their aqueous solutions in solid form by adding a mineral acid salt to the mineral acid solutions obtained at the diazotization of the bases.

KARL SCHNITZSPAHN.